US010511602B2

(12) United States Patent
Siwal et al.

(10) Patent No.: US 10,511,602 B2
(45) Date of Patent: Dec. 17, 2019

(54) METHOD AND SYSTEM FOR IMPROVING NETWORK SECURITY

(71) Applicant: AVG Netherlands B.V., Amsterdam (NL)

(72) Inventors: Amit Siwal, Haarlem (NL); Pavel Mironchyk, Vleuten (NL)

(73) Assignee: Avast Software s.r.o. (CZ)

( * ) Notice: Subject to any disclaimer, the term of this patent is extended or adjusted under 35 U.S.C. 154(b) by 158 days.

(21) Appl. No.: 15/604,206

(22) Filed: May 24, 2017

(65) Prior Publication Data
US 2017/0353462 A1 Dec. 7, 2017

Related U.S. Application Data

(60) Provisional application No. 62/344,766, filed on Jun. 2, 2016.

(51) Int. Cl.
H04L 29/06 (2006.01)
H04W 4/70 (2018.01)
H04W 12/08 (2009.01)

(52) U.S. Cl.
CPC .......... *H04L 63/10* (2013.01); *H04L 63/0227* (2013.01); *H04L 63/08* (2013.01); *H04L 63/101* (2013.01); *H04L 63/102* (2013.01); *H04L 63/108* (2013.01); *H04W 4/70* (2018.02); *H04W 12/08* (2013.01); *H04L 2463/082* (2013.01)

(58) Field of Classification Search
None
See application file for complete search history.

(56) References Cited

U.S. PATENT DOCUMENTS

| 9,094,407 | B1* | 7/2015 | Matthieu | H04W 4/70 |
| 2015/0089621 | A1* | 3/2015 | Khalid | H04L 63/08 726/9 |
| 2015/0249642 | A1 | 9/2015 | Burns et al. | |
| 2015/0369618 | A1 | 12/2015 | Barnard et al. | |
| 2017/0063823 | A1* | 3/2017 | Cheng | H04W 76/10 |
| 2017/0063940 | A1* | 3/2017 | Lapidous | H04L 63/0281 |
| 2017/0171187 | A1* | 6/2017 | Yin | H04L 63/083 |
| 2017/0195318 | A1* | 7/2017 | Liu | H04W 12/06 |
| 2017/0195331 | A1* | 7/2017 | Wu | G05B 19/41885 |
| 2017/0324710 | A1* | 11/2017 | Terakedis | H04L 51/12 |

OTHER PUBLICATIONS

International Search Report Application No. PCT/IB2017/000832, Application Filing Date May 24, 2017, dated Nov. 23, 2017.

* cited by examiner

*Primary Examiner* — Malcolm Cribbs
(74) *Attorney, Agent, or Firm* — Kramer Levin Naftalis & Frankel LLP

(57) ABSTRACT

Methods and systems for securing a network including IoT devices are provided. A networking device system can regulate the ability of IoT devices to communicate with their corresponding cloud servers over the Internet, for example, by allowing a device to connect to its associated cloud servers when a user (e.g., an authorized user) requests to use the device. The system can communicate (e.g., directly) with users outside of the network through an app and/or a software development kit installed on user client device(s), where communications received from the app or kit (e.g., to access one or more IoT devices on the network) can be presumed to originate from authorized users.

20 Claims, 3 Drawing Sheets

METHOD AND SYSTEM FOR IMPROVING NETWORK SECURITY

CROSS-REFERENCE TO RELATED PROVISIONAL APPLICATION

This application claims the benefit of U.S. Provisional Patent Application No. 62/344,766, filed on Jun. 2, 2016, the disclosure of which is hereby incorporated herein by reference in its entirety.

FIELD OF THE INVENTION

The present invention is directed to embodiments of a new process and system for improving network security, and more specifically, the security of networks connected to Internet of Things (IoT) devices.

BACKGROUND OF THE INVENTION

What was once merely a digital means for connecting people around the world, the World Wide Web has evolved to now also connect "things". The IoT is essentially a network of physical objects, such as gadgets and cars, embedded with electronic sensors and software, as well as networking components that enable these objects to exchange data over the Internet. Some popular IoT devices include Wi-Fi video cameras (e.g., the Dropcam) and temperature sensors. While these devices generally enhance user experiences, they can pose security risks to the networks (whether home or enterprise) to which they are connected. IoT devices are typically configured to remain continuously connected to the Internet (i.e., to associated cloud application servers) regardless of whether the devices are in actual use. If a device is hacked (such as by exploiting a bug in its software), this can subject the network to unauthorized access. For some devices, a continuous Internet connection is justified and even required to achieve their intended purposes. For example, temperature sensors must be allowed to continuously stream data to the cloud to update users on the conditions of their homes. Most devices, however, such as Wi-Fi video cameras, have no need for such access—in these cases, more devices on a network generally translates to higher exposure to attacks; when these devices are not in use, their live Internet connections serve no purpose other than as pathways for malicious agents to enter the network.

Conventionally, networks (both in the home and enterprises) have been secured via rules-based firewalls or Virtual Private Networks (VPNs) that block unauthorized access to client and IoT devices on the networks. These solutions, however, are not designed to actively communicate with remote client users and to control device access to the Internet based on usage of the devices. If a network is only accessible through a VPN, for example, then the user is required to utilize a VPN client to communicate to the network. Conventional routers/gateways are also unable to identify whether an IoT device is merely communicating with an authorized external server or has been compromised by a malicious user. To date, IoT device and network security has rested mainly on device manufacturers, many of whom implement client/device communication schemes with little emphasis on device security.

SUMMARY OF THE INVENTION

Generally speaking, it is an object of the present invention to improve the security of networks connected to Internet of Things devices.

According to an exemplary embodiment of the present invention, a method of securing a network is provided, and involves at least one Internet of Things ("IoT") device associated with at least one remote server. The at least one IoT device can be communicatively coupled to a networking device having at least one data processor. The networking device can be configured to provide the at least one IoT device conditional access to the at least one remote server over the Internet. The method can include receiving, at the networking device, a communication from a client device, determining whether the communication includes a request to utilize one of the at least one IoT device, permitting the one IoT device access to the at least one remote server when the communication includes the request, and otherwise restricting the one IoT device from accessing the at least one remote server.

Still other objects and advantages of the present invention will in part be obvious and will in part be apparent from the specification, and the scope of the invention will be indicated in the claims.

The present invention accordingly comprises the features of construction, combinations of elements, and arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The inventive embodiments are described in greater detail hereinafter with reference to the accompanying drawing figures, in which.

DETAILED DESCRIPTION OF THE PREFERRED EMBODIMENTS

According to an embodiment of the present invention, a network-based security system is provided (e.g., as an active outgoing firewall). The system can be implemented as a single or multiple applications or modules configured to effect novel security processes described herein, and can be installed on a router (such as a WiFi-enabled router), a smart home hub, a network/gateway (e.g., an enterprise gateway), or the like.

In contrast to existing firewalls, the system can regulate the ability of IoT devices (in a home or office network) to communicate with their corresponding cloud servers over the Internet. According to one embodiment, the system can allow a device to connect to its associated cloud servers only when a user (e.g., an authorized user) requests to use the device. In certain embodiments, the system can communicate (e.g., directly) with users outside of the network through an app and/or a software development kit (SDK) installed on user client device(s)—communications received from the app or SDK (e.g., to access one or more IoT devices on the network) can be presumed to originate from authorized users. This advantageously eliminates the need for complicated VPN infrastructure and is particularly useful in home environments where VPN solutions are often expensive and difficult to manage and maintain.

According to an exemplary embodiment, the system can allow for configuration of Internet access control settings for all IoT devices on a network. In certain embodiments, the system can allow users to configure one or more rules to control whether IoT devices have access to the Internet. In other embodiments, the system can, over time, programmatically learn the rules for controlling the access, and can implement these rules to automatically block and/or unblock device access.

A user can, for example, set one or more rules that block each smart home device from accessing their associated cloud servers during nighttime hours. One exemplary rule can permit a device to connect to the Internet only after a (rule-based) "handshake" occurs between a network gateway and a trusted client configured in the gateway. Another exemplary rule can unblock an IoT device if a request to access the device is received from a user client device registered on the network.

In certain embodiments, users can also define personalized settings for all their IoT devices via a single application (e.g., via a single user interface). This is in contrast to conventional implementations, where communication preferences for each device must be individually managed via its own device settings. In certain embodiments, the system is also configured to monitor the status of all authorized users of the network at any given point, and can detect unusual network activity.

Figure 1:
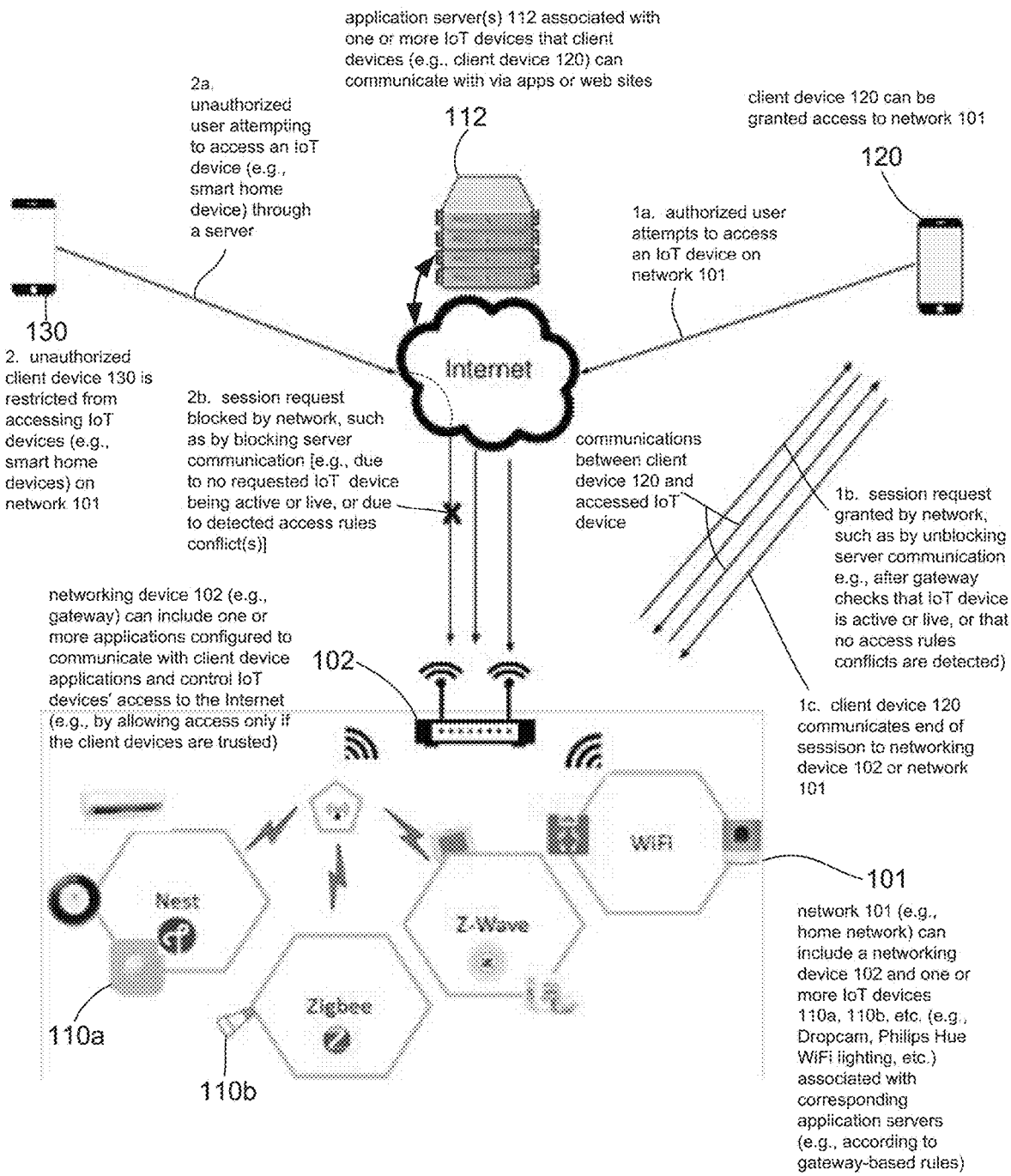
FIG. 1 is a schematic diagram of an exemplary implementation of a network-based security system according to embodiments of the present invention.

Referring to FIG. 1, a network 101 (e.g., a local area network ["LAN"]) can include a networking device 102 communicatively coupled to one or more IoT devices 110a and 110b (e.g., Wi-Fi video cameras, Wi-Fi-lighting devices, etc.) associated with corresponding application servers 112. Networking device 102 can include an exemplary system configured to control client device access to the IoT devices on network 101. The system can deny access (e.g., to client device 130) if a requested IoT device is inactive or if condition(s) are not met in predefined access rule(s), and can grant access (e.g., to client device 120) otherwise.

According to another exemplary embodiment, the system can allow each IoT device to access the Internet (e.g., to connect to its associated cloud server) only upon user authorization or request to use that device. The system can include two subsystems (which can, for example, be implemented as one or more algorithms) that provide a two-factor authentication process for IoT device access. The first subsystem can be implemented on a user's Internet client or client device (e.g., a smartphone, a mobile phone, a personal computer, a laptop, a tablet, or the like), and can be configured to detect user requests to utilize the IoT devices. The second subsystem can be implemented on a router (e.g., a consumer or commercial LAN router), and can be configured to manage Internet access for IoT devices (e.g., by blocking and/or unblocking access) on the network. The algorithm(s) can, for example, restrict an IoT device's access to the Internet, unless the user accesses a mobile app or web service associated with the IoT device.

In one embodiment, the first subsystem can detect user requests by monitoring user access to one or more client device web/mobile/desktop applications (e.g., apps or webapps) associated with the IoT device(s). The user client device can also include one or more databases storing information regarding IoT devices (on the home or office network) and any installed client applications associated therewith. According to some embodiments, the first subsystem can be implemented as part of, or integrated with, antivirus software (AV) installed on the user's client device.

Figure 2:
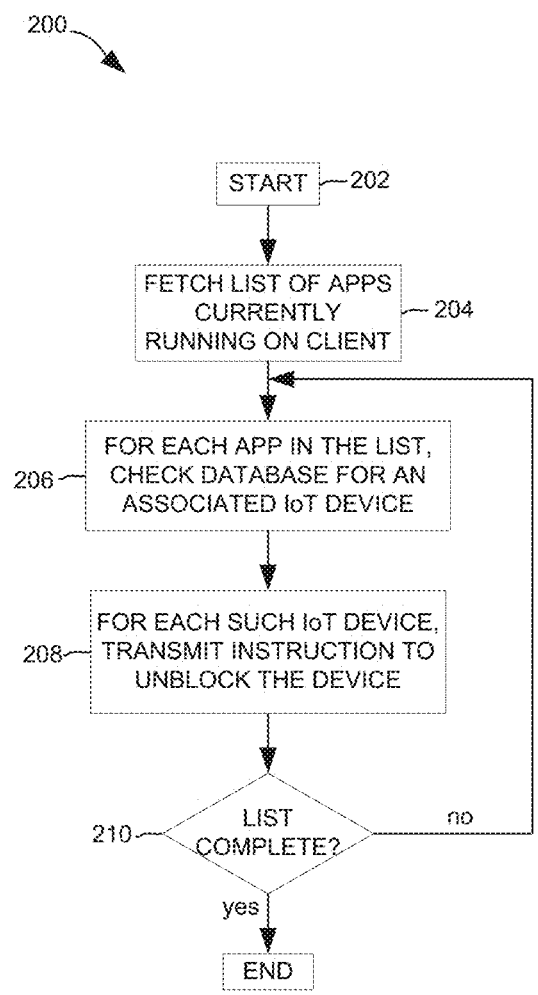
FIGS. 2 and 3 are flowcharts showing exemplary processes for managing IoT device access to the Internet according to embodiments of the present invention.

Referring to FIG. 2, process 200 can be implemented as one or more applications and/or modules for execution on a client device (e.g., client device 120). Process 200 can begin at step 202, and can execute periodically. Step 204 can include fetching or retrieving a list of apps (e.g., web apps) currently running on the client device. For each app in the list, an associated IoT device can be identified (step 206)— for example, by checking or accessing a database on the client device or on a remote server associated with the network)—and one or more requests can be transmitted from the client device to the network (step 208) to gain access to the IoT device. Access can be granted, for example, by activating the IoT device or otherwise allowing it to communicate over the Internet with the client device and/or the IoT device's associated application server. Steps 206 and 208 can be repeated until all the apps in the list have been accounted for (step 210), after which the process can end.

Figure 3:
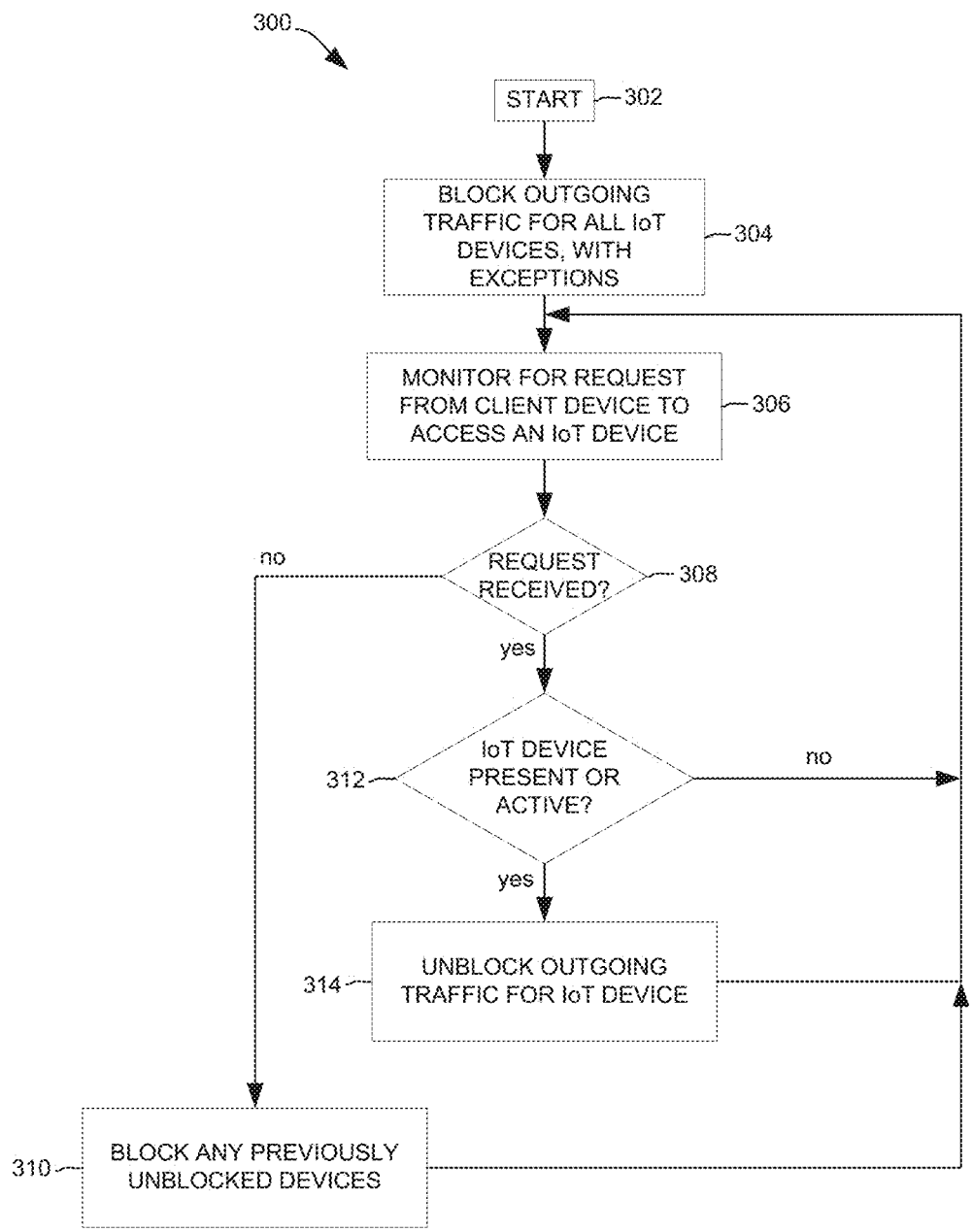

Referring to FIG. 3, process 300 can be implemented as one or more applications and/or modules for execution on a networking device (e.g., networking device 102, such as a router). Process 300 can begin at step 302. Step 304 can include blocking outgoing traffic for all IoT devices on the network, except for those that have been pre-selected to have continuous access (e.g., whitelisted by a user). At step 306, the process can include monitoring or waiting for a request (e.g., signal) from a user client device (e.g., client device 120) to access an IoT device. If no request(s) are received from the client device (at step 308), the process can include blocking any (or all) previously unblocked IoT devices (step 310). On the other hand, if a request is received from the client device (at step 308), the process can include determining whether the requested IoT device is present or otherwise active on the network (e.g., LAN) (step 312). If the requested IoT device is not present or otherwise active, the process can return to step 306. If the requested IoT device is present or is otherwise active, however, the process can include unblocking outgoing traffic of requested IoT device (step 314) and returning to step 306.

It should be understood that the steps shown in processes 200 and 300 are merely illustrative and that existing steps may be modified or omitted, additional steps may be added, and the order of certain steps may be altered.

An example of the two-factor authentication process (e.g., in a scenario where the login credentials of a user's webcam [or other device] have been compromised by a hacker, who now can gain access to the live data feed from the device) is as follows:

Router-based service or system monitors Internet access to the IoT device (as well as other devices on the network);
  The system monitors usage of one or more apps on an authorized user's client device; and
  Only if the authorized user accesses an app on the client device associated with the webcam, for example, will the system temporarily enable Internet access to the webcam. In this way, the hacker (who is not authorized by the system) is restricted from accessing the device, despite having the login credentials therefor.

In some embodiments, the system can be configured to nevertheless allow limited Internet access to the webcam or other IoT devices for certain communications, such as software updates from their associated cloud servers, or the like.

Embodiments of the present invention thus advantageously provide a cost effective and user-friendly security solution that protects networks with little to no need for complex firewall and/or VPN solutions. The additional layer of security between IoT devices and users attempting to access these devices remotely, including the limited Internet connectivity of network-connected devices (such as by blocking devices from accessing the Internet), reduces the risk of exposure to undesired attacks. As described above, this is particularly advantageous for devices such as consumer or office webcams—when equipped with embodiments of the present invention [e.g., in a network, including the router(s) and user client device(s)], the webcam (or other IoT device) can be restricted from Internet access, and its live data feeds can be inaccessible to unauthorized, non-registered users even if they possess the device's login credentials.

As described above, the system can be implemented on a network router (either consumer or enterprise). For conventional routers, it can be challenging for the less tech-savvy to configure and switch VPN locations. To overcome these disadvantages, the system can be implemented on a network router preconfigured with a dedicated WiFi hotspot that supports VPN features and that is activatable during router setup. Such a router can provide a novel user interface having option for creating a VPN as a separate, location-based hotspot.

The dedicated VPN hotspot configuration can include the name of the hotspot and a hidden DNS address preset with a VPN solutions provider. When a user completes router setup, the router automatically creates the main WiFi hotspot as well as the dedicated VPN hotspot. In this way, a user can "enable" and/or "disable" use of the VPN by simply switching between the main WiFi hotspot and the VPN WiFi hotspot, eliminating the need to reconfigure DNS and restarting the router and all devices on the network.

The router can create a hotspot that allows access to content in another country. For example, for a user located outside of the U.S., the router can create a U.S. VPN hotspot that allows access to U.S.-based content—if the user wishes to connect to a media streaming program (e.g., Netflix) in the U.S., the user can simply switch the device to the VPN WiFi hotspot. As another example, for a household in Canada, the router can create a U.K. VPN hotspot that allows access to U.K.-based content—if a user in the household wishes to access British content, the user can switch the device to connect to the VPN WiFi hotspot.

The dedicated VPN hotspot thus provides for "local" WiFi connection for safe routine browsing, and allows users to utilize benefits of VPN for all devices on the network. This advantageously eliminates the need for often difficult and time-consuming configuration of VPNs on individual devices. Furthermore, the router implementation simplifies use of routers and VPN solutions, which is beneficial not only to users, but also to router hardware manufacturers and VPN solutions providers.

It should be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electromagnetic, infrared, or semiconductor system, apparatus, device, or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

Those of ordinary skill in the art will understand that the term "Internet" used herein refers to a collection of computer networks (public and/or private) that are linked together by a set of standard protocols (such as TCP/IP and HTTP) to form a global, distributed network. While this term is intended to refer to what is now commonly known as the Internet, it is also intended to encompass variations that may be made in the future, including changes and additions to existing protocols.

It will thus be seen that the objects set forth above, among those made apparent from the preceding description and the accompanying drawings, are efficiently attained and, since certain changes can be made in carrying out the above methods and in the constructions set forth for the systems without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed:

1. A method of securing a network, involving at least one Internet of Things ("IoT") device associated with at least one remote server, the at least one IoT device being communicatively coupled to a networking device having at least one data processor, the networking device being configured to provide the at least one IoT device conditional access to the at least one remote server over the Internet, the method comprising:
   receiving, at the networking device, a communication from an antivirus application of a client device;

determining, by the networking device, whether the communication includes a user request to access the at least one IoT device;
when the communication includes the user request:
permitting, by the networking device, the client device to access the IoT device; and
permitting, by the networking device, the IoT device to access the at least one remote server; and
when the user request is absent from the communication, restricting, by the networking device, the at least one IoT device from accessing the at least one remote server.

2. The method of claim 1, wherein the at least one IoT device includes at least one of a webcam or a temperature sensor, the method further comprising restricting the client device from accessing the at least one IoT device when the user request is absent from the communication.

3. The method of claim 1, wherein the networking device includes a router or a smart home hub.

4. The method of claim 1, wherein the at least one remote server includes at least one cloud-based server.

5. The method of claim 1, further comprising authenticating the client device based on a two-factor authentication process that temporarily permits Internet access to the at least one IoT device.

6. The method of claim 5, wherein the authenticating includes determining that the communication is associated with at least one pre-identified program associated with the at least one IoT device.

7. The method of claim 6, wherein the at least one pre-identified program is associated with a software development kit (SDK) installed on the client device.

8. The method of claim 1, further comprising permitting the at least one IoT device access to the at least one remote server based on at least one user-defined rule.

9. The method of claim 8, wherein the at least one user-defined rule involves Internet access control settings based on time of day.

10. A networking device configured to provide at least one IoT device conditional access to at least one remote server over the Internet, comprising:
a receiver configured to receive a communication from an antivirus application of a client device; and
at least one data processor configured to:
determine whether the communication received from the antivirus application of the client device includes a user request to utilize the at least one IoT device;
permit the client device to access the IoT device when the communication includes the user request;
permit the at least one IoT device to access the at least one remote server when the communication includes the user request; and
restrict the at least one IoT device from accessing the at least one remote server when the user request is absent from the communication.

11. The networking device of claim 10, wherein the at least one IoT device includes at least one of a webcam or a temperature sensor.

12. The networking device of claim 10, wherein the at least one remote server includes at least one cloud-based server, the at least one data processor configured to:
restrict the client device from accessing the at least one IoT device when the user request is absent from the communication.

13. The networking device of claim 10, wherein the at least one data processor is further configured to authenticate the client device based on a two-factor authentication process that temporarily permits Internet access to the at least one IoT device.

14. The networking device of claim 13, wherein the at least one data processor is configured to authenticate the client device by determining that the communication is associated with at least one pre-identified program associated with the at least one IoT device.

15. The networking device of claim 14, wherein the at least one pre-identified program is associated with a software development kit (SDK) installed on the client device.

16. The networking device of claim 10, wherein the at least one data processor is further configured to permit the at least one IoT device access to the at least one remote server based on at least one user-defined rule.

17. The networking device of claim 16, wherein the at least one user-defined rule involves Internet access control settings based on time of day.

18. A non-transitory computer readable medium for securing a network, the network including a networking device having at least one data processor, the networking device being communicatively coupled to at least one IoT device and configured to provide the at least one IoT device conditional access to at least one remote server over the Internet, the computer readable medium including instructions that, when executed by the at least one data processor, cause the at least one data processor to:
receive, at the networking device, a communication from an antivirus application of a client device;
determine whether the communication includes a user request to access the at least one IoT device;
permit the client device to access the IoT device when the communication includes the user request;
permit the at least one IoT device to access the at least one remote server when the communication includes the user request; and
restrict the at least one IoT device from accessing the at least one remote server when the user request is absent from the communication.

19. The computer readable medium of claim 18, wherein the at least one IoT device includes at least one of a webcam or a temperature sensor, the computer readable medium including instructions that, when executed by the at least one data processor, cause the at least one data processor to restrict the client device from accessing the at least one IoT device when the user request is absent from the communication.

20. The computer readable medium of claim 18 including instructions that, when executed by the at least one data processor, cause the at least one data processor to authenticate the client device based on a two-factor authentication process that temporarily permits Internet access to the at least one IoT device.

* * * * *